No. 842,123. PATENTED JAN. 22, 1907.
G. H. STOUT.
CONTAINING CELL FOR BATTERIES.
APPLICATION FILED AUG. 13, 1903.
2 SHEETS—SHEET 1.
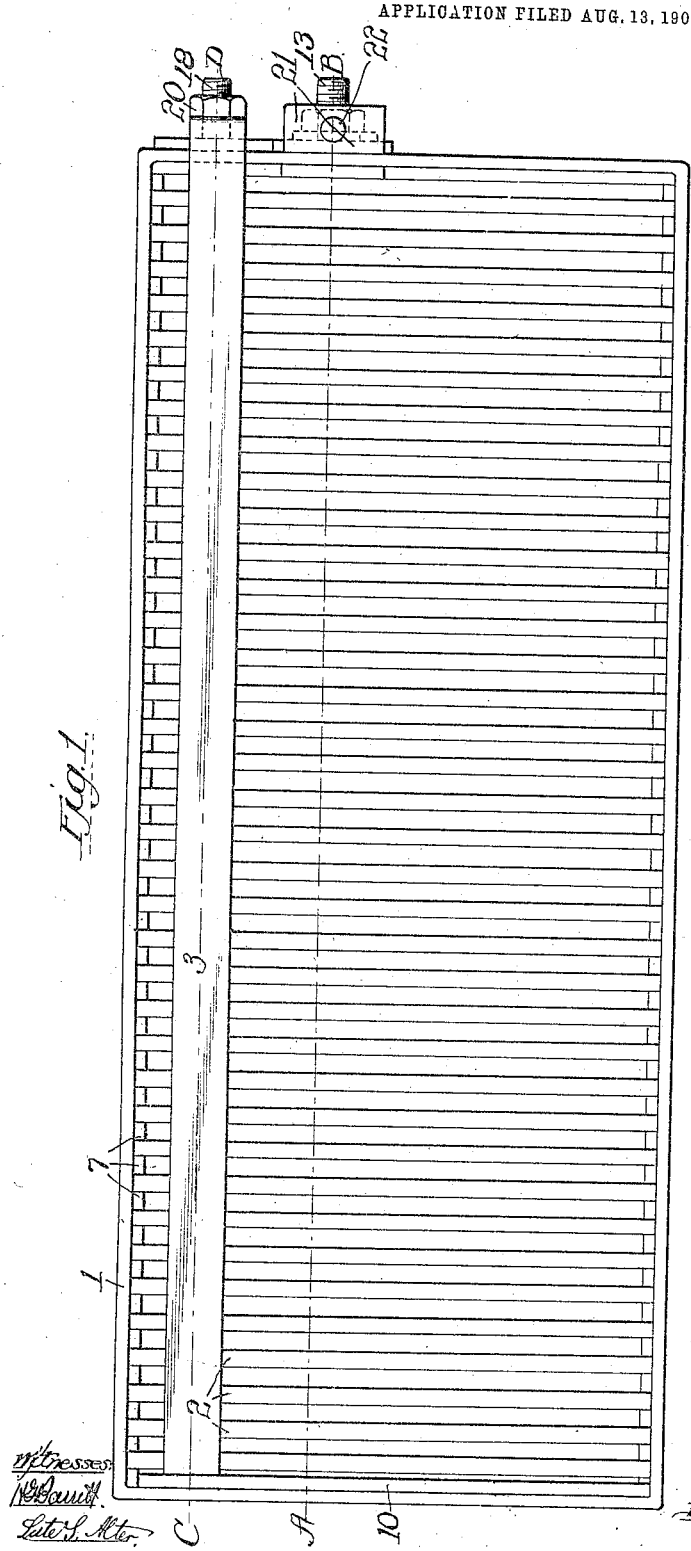
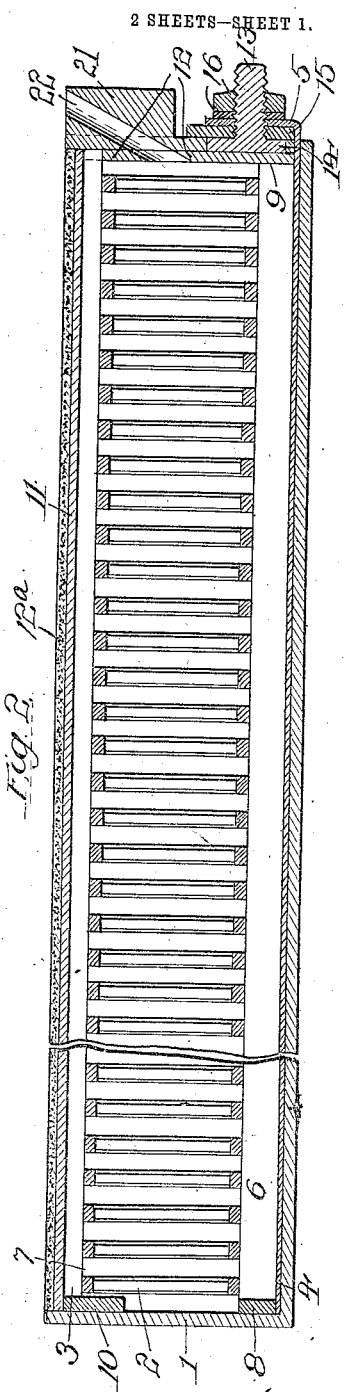
Inventor:
George H. Stout
By Rector & Kibben
His Attorneys

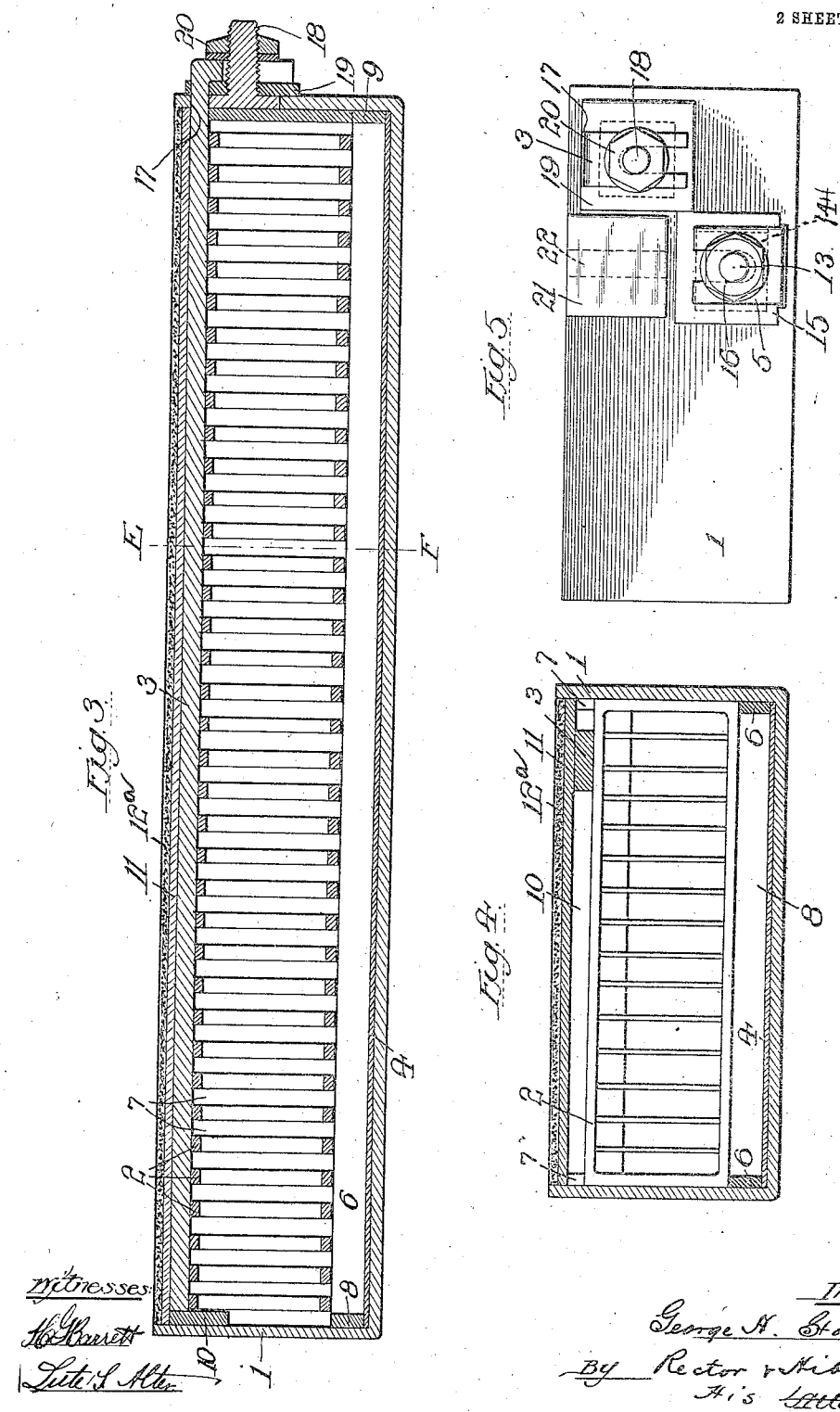

UNITED STATES PATENT OFFICE.

GEORGE H. STOUT, OF CHICAGO, ILLINOIS, ASSIGNOR, BY MESNE ASSIGNMENTS, TO AUTOMOBILE PARTS AND EQUIPMENT COMPANY, OF CHICAGO, ILLINOIS, A CORPORATION OF ILLINOIS.

CONTAINING-CELL FOR BATTERIES.

No. 842,123.        Specification of Letters Patent.        Patented Jan. 22, 1907.

Application filed August 13, 1903. Serial No. 169,354.

*To all whom it may concern:*

Be it known that I, GEORGE H. STOUT, residing at Chicago, Cook county, Illinois, have invented certain new and useful Improvements in Containing-Cells for Batteries, of which the following is a specification.

My invention relates to what are known as "containing-cells" for batteries; and the object thereof is to produce a cell of this character of improved construction and increased advantage and utility, as will be made apparent from the description hereinafter given.

In the drawings, Figure 1 is a plan view of my containing-cell, but with the lid or cover removed to exhibit the general interior construction; Fig. 2, a longitudinal section on line A B of Fig. 1, but with the cover in place; Fig. 3, a longitudinal section on line C D of Fig. 1; Fig. 4, a transverse section on line E F of Fig. 3, and Fig. 5 an elevation of the electrical terminal end of the cell.

My cell comprises, as shown, a cell or casing 1 of suitable dimensions, but, by preference, rectangular in plan and somewhat shallow in order that a series of the cells may be conveniently stacked or piled one on top of the other. This cell or casing may be made of any suitable non-conducting material, such as a hard-rubber composition commonly known as "vulcan."

The positive electrode consists of a series of plates comprising grids 2, to which the plastic substance is applied, as usual in batteries of this class, and joined together at their top by means of a connecting-bar 3, which will be hereinafter referred to. The negative plate or electrode consists of a flat plate 4, of copper or the like, resting flat upon the bottom of the cell and having a terminal 5 extending through one end of the cell, as hereinafter described.

Against the opposite longer sides of the cell are arranged strips 6, which are entire as to their lower portion, but slotted as to their upper portion, so as to leave a series of dividing-fingers 7. The slots in the two strips register with each other and receive the ends of the grids, as shown in the drawings. These strips thus support the grids and hold them a predetermined distance above the bottom of the cell or the negative plate, as indicated in Figs. 2, 3, and 4. Such strips also serve to divide or separate the grids and insulate them from the negative plate. End cleats 8 and 9, of non-conducting material, are preferably provided between the ends of the strips 6, which, together with the cleats, rest upon the negative plate and hold it in place in the bottom of the cell, with the result that the negative electrode is rigidly fastened and vulcanized in the cell itself. One end of the cell is also provided with a second or top cleat 10 to support the lid or cover 11 for closing the open top of the cell, which cover is supported at the other end by the extension 12 from the bottom cleat 9, as seen in Fig. 2. The cover 11 finds support at its longer sides upon the top of the strips 6, or rather the upwardly-projecting fingers thereof, and the same when in place is slightly below the plane of the top surface or plane of the cell. At the proper time the cover is securely sealed at all its edges and the space formed between it and the top plane of the cell is filled with a suitable plastic material $12^a$, which may, in fact, be the sealing material for sealing the edges of the cover, all as indicated in Figs. 2, 3, and 4.

The negative terminal 5 is electrically connected to the negative-plate and extends laterally through one end of the cell. This terminal, preferably slotted, Fig. 5, is bent upwardly to receive the shank of a bolt 13, secured or anchored in the cell in a peculiar and advantageous manner. This bolt has an angular head 14 of the same thickness as the end wall of the cell and received in an opening in such wall of the same size with the result that the bolt is effectually held against rotation. The bolt-head is insulated on one side by the cleat or strip 9 and on the other side by the insulating strip or plate 15. The nut and washer 16 hold the terminal 5 in place and make the proper connection. This terminal is consequently thoroughly insulated and isolated.

The positive terminal is formed by the connecting-bar 3, which, in the present instance, is carried laterally through an opening 17 in the end wall of the cell and secured to a bolt 18 similar to the other bolt 13. The head of this bolt 18 is anchored in an angular opening in the said end wall of the cell and insulated on opposite sides by the extension 12 and strip 19, respectively. The free end of the bar, which is slotted to receive the bolt 18, is secured in place by the nut and washer 20, Figs. 3 and 5.

The terminal end wall of the cell has a solid extension or block 21, which may be arranged at the top and at any point along the length of this wall, but by preference toward one side, as shown in Fig. 1. A diagonal hole 22, drilled or formed in this block and extending through the end wall of the cell and extension 12, serves to permit the proper supply of acid to the cell.

My cell may be used either as a primary or a secondary battery, and, if desired, a thin layer or film of mercury may be provided upon the top of the copper plate forming the negative electrode to reduce local action.

A cell made in accordance with my invention is durable, efficient, and of high power. Moreover, the cell is simple and economical of construction, as will as convenient in use as regards the assembling of a series thereof and the making of connections all at the same end of the cell.

I claim—

1. A cell comprising a casing or cell proper, having a series of slots or grooves on opposite sides, a series of elements received in said slots to form one electrode, and a plate arranged in the bottom of the cell to form the other electrode.

2. A cell comprising a casing or cell proper, strips arranged at two opposite sides of the cell and provided with a series of upwardly-projecting fingers, a series of elements received between said fingers to form one electrode, and a plate arranged in the bottom of the cell to form the other electrode.

3. A cell comprising a casing or cell proper, a plate arranged in the bottom of the cell to form one electrode, strips arranged at two opposite sides of the cell and resting upon said plate, said strips having a series of upwardly-projecting fingers, and a series of elements received and supported between said fingers to form the other electrode.

4. A cell comprising a casing or cell proper, strips secured to two opposite sides of the cell and having their lower portions entire as to a part of their height and provided with upwardly-extending fingers thereabove, a series of elements received between said fingers and supported above the bottom of the cell to form one electrode, and a plate arranged in the bottom of the cell to form the other electrode.

5. A cell comprising a casing or receptacle 1, strips 6 having fingers 7 and secured to opposite sides of the cell in the interior thereof, end cleats 8 and 9 in the cell, a plate 4 in the bottom of the cell to form one electrode, and a series of grids 2 received and supported between said fingers to form the other electrode.

6. A cell comprising a casing or cell proper, strips secured to two opposite sides of the cell and having their lower portions entire as to a part of their height and provided with upwardly-extending fingers thereabove, a series of elements received between said fingers and supported above the bottom of the cell, to form one electrode, a plate arranged in the bottom of the cell to form the other electrode, and a lid or cover resting upon the upper ends of such strips.

7. A cell comprising a casing or cell proper, strips secured to two opposite sides of the cell and having their lower portions entire as to a part of their height and provided with upwardly-extending fingers thereabove, a series of elements received between said fingers and supported above the bottom of the cell, to form one electrode, a plate arranged in the bottom of the cell to form the other electrode, a lid or cover resting upon the upper ends of such strips, and sealing material disposed on top of such cover.

8. A cell comprising a receptacle or cell proper having the battery elements and having a terminal consisting of a bolt having a corresponding angular opening to receive said bolt-head, insulating-strips for insulating the opposite sides of said head, and means for connecting one of the electrodes with said bolt.

9. A cell comprising a receptacle or cell proper having a plate 4 forming one electrode and provided with a tongue or extension 5 passing through the terminal end wall of the cell, said end wall having an angular opening, a bolt projecting laterally from said end wall and having a head received by said opening, strips for insulating the opposite sides of the bolt-head, said bolt being connected with the tongue 5, a series of grids arranged in said cell and forming the other electrode.

10. A cell comprising a receptacle or cell proper having a plate 4 forming one electrode and provided with a tongue or extension passing through the terminal end wall of the cell, a series of grids arranged in said cell, a bar for connecting the same, said end wall having two angular openings, one for each terminal, two bolts having heads received by said openings respectively, means for insulating said heads, and means for connecting said bar and said tongue respectively to the bolts.

11. A cell comprising a casing or cell proper having battery elements, strips 6 having fingers 7 and secured to opposite sides of the cell in the interior thereof but below its top plane, to support one set of said elements, end cleats 8 and 9 in the cell, said cleat 9 having an upward extension 12, a top end cleat 10, and a cover arranged to rest upon said fingers and upon the top cleat 10 and extension 12.

12. A cell comprising a receptacle or cell proper having battery elements, a support and insulator device arranged within the cell for one set of said elements and comprising transversely-grooved strips on opposite sides of the cell, a lid or cover resting on said support or insulator device, and a plastic material for sealing said cover onto the cell.

GEO. H. STOUT.

Witnesses:
S. E. HIBBEN,
L. E. ROSS.